April 11, 1950  M. L. STUDEBAKER  2,503,361
CARBON BLACK PELLETING
Filed April 23, 1945
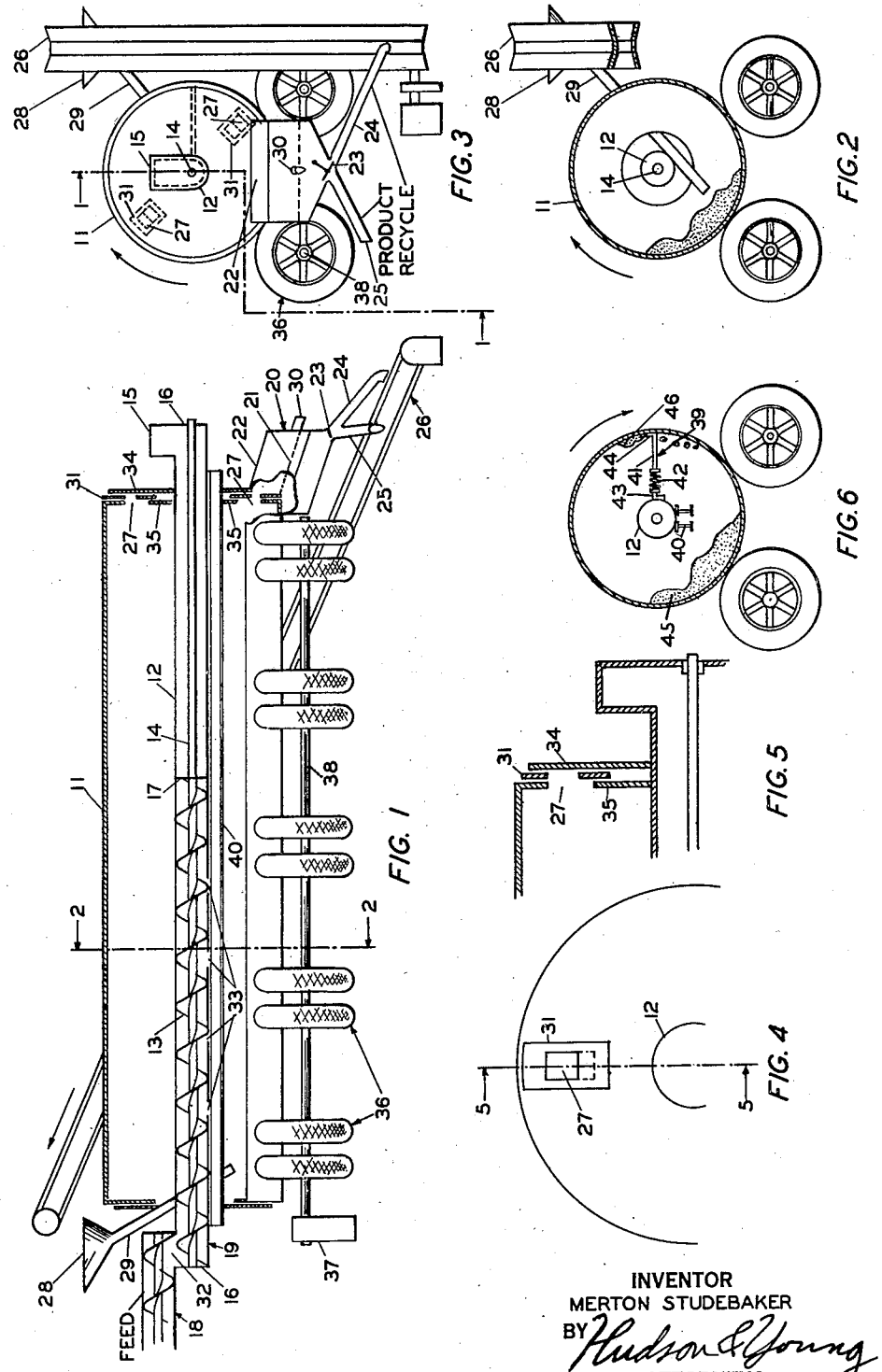
INVENTOR
MERTON STUDEBAKER
BY Hudson & Young
ATTORNEYS Patented Apr. 11, 1950

2,503,361

UNITED STATES PATENT OFFICE 2,503,361

CARBON BLACK PELLETING

Merton L. Studebaker, Bartlesville, Okla., assignor to Phillips Petroleum Company, a corporation of Delaware Application April 23, 1945, Serial No. 589,811

4 Claims. (Cl. 23—314)

This invention relates to the manufacture of carbon black. In one of its more specific aspects it relates to a process and an apparatus for the transformation of light, dusty carbon black as produced, into free flowing, relatively dustless, small aggregates of density 20 pounds or more per cubic foot.

Carbon black is a very extraordinary substance. It is usually made by the incomplete combustion of a hydrocarbon, some processes using hydrocarbon gas as charge stock, while others use liquid hydrocarbons ranging in degree through materials as high boiling as gas oils and even viscous asphaltic crude oils. It has been found that in processes using such charge stocks, a slight variation in operating conditions frequently causes a marked effect on the properties of the resulting carbon black. This latter sensitivity may possibly be due to the fact that carbon black particles are very, very small. They are, in fact, sub-microscopic. Such particles fall within the size range of colloidal particles. It is well known that colloidal particles possess an extremely great surface area per unit of mass or weight. It is also known that solid surfaces possess the property of adsorbing materials from a disperse phase. Since carbon black is formed as very small particles having large surface areas, excellent opportunity exists for adsorption of, for example, gaseous molecules during cooling. The gaseous environment including the kind of gas, the molecular weight of the gas, the temperature, its concentration and pressure, etc., materially affects carbon particle formation as regards size of particle and its surface condition as well as the material adsorbed. As temperature of a newly formed carbon black is lowered particle size tends to increase as well as does the adsorption of gases. By the time carbon black is fully cooled to storage temperature considerable charged material, usually negative, has been adsorbed since carbon black ordinarily possesses a negative surface charge. If each particle possesses a sufficiently strong negative charge, agglomeration into larger units may be difficult since like signs repel. However, if agglomeration or precipitation or cohesive forces are greater than the like-charge repelling action, then agglomeration may occur. The degree of agglomeration may at least to some extent be dependent on the difference between the agglomerative force and the repellent force. From the above considerations it will be seen that variations in such operating conditions as temperature, gaseous environment, rate of cooling, and others, may markedly affect the agglomerating properties of carbon black.

Such is apparently the case since two carbon blacks made under even slightly different conditions cannot necessarily be pelleted under the same pelleting conditions to form the same kind of pellets. The condition of carbon black is apparently so sensitive with respect to pelleting that normal pelleting conditions for one particular black may fail entirely to pellet another black. Then, also, some carbon blacks may completely resist agglomeration while others under certain pelleting conditions tend to over-pelletize or more strictly speaking to gum or ball. For the most part some carbon blacks may be very "sticky." By the term "sticky," I do not mean that carbon black particles stick to one another or adhere to container surfaces because of the presence of sticky or adhesive matter since carbon blacks having substantially zero per cent acetone extractable content and which are substantially tar-free may yet be "very sticky." This stickiness may apparently be due to some surface condition which at the present state of the art is not well understood. While I have described probable theories of carbon black agglomeration it is obvious that my invention is operable regardless of whether these theories should be proved false and does not depend thereon for patentability.

Many of the types of carbon black made by the furnace processes described in the Krejci patents, 2,375,795; 2,375,796; 2,375,797 and 2,375,798 all granted May 15, 1945, are carbon blacks "difficult" to convert into commercial pellets. The difficulty encountered is the above mentioned tendency to over pelletize, or gum or ball. I have tried to use well known pelleting processes and apparatus to pellet this carbon black to a commercial product acceptable to large scale carbon black users. Such attempts in all cases resulted in failure.

However, I have devised a commercial sized apparatus and have found a proper method for the operation of such apparatus which successfully transforms into pellets acceptable to the rubber compounding industry the carbon black made according to the above mentioned patents.

Accordingly, one object of my invention is to devise an apparatus and method for the operation of such an apparatus for pelleting the carbon black made according to the Krejci process.

Another object of my invention is to provide an apparatus and a method for pelleting such carbon blacks as tend to over pellet or ball or gum by conventional or known processes.

Another object of my invention is to furnish a simple apparatus and an inexpensive method for operating such an apparatus for pelleting any carbon blacks which possess such properties as to be adaptable for pelleting in such an apparatus.

Still other objects and advantages in the use of my method and apparatus will be understood by those skilled in such art from a careful study of the following description in which Figure 1 is a diagrammatic longitudinal section of my pelleting apparatus taken on the line 1—1 of Figure 2.

Figure 2 is a cross section of this apparatus taken on the line 2—2 of Figure 1.

Figure 3 is an end elevation of my apparatus.

Figure 4 is an end view of a portion of the mill showing in some detail the adjustable outlet openings for discharge of pelleted back and scale, with parts broken away.

Figure 5 is a cross sectional view taken on the line 5—5 of Figure 4.

Figure 6 is a cross sectional view of the cylindrical mill showing the location of the spring loaded scraper.

Referring now to the drawing, numeral 11 refers to an elongated hollow cylindrical container, hereinafter referred to as the pellet mill. Suspended longitudinally in this hollow cylinder and extending beyond either end is a pipe or tube 12. The upstream portion of this tube carries a helical or conveyor screw 13, the shaft 14 of which extends on through the discharge end of the mill for driving or power purposes. This screw may be powered by any satisfactory source of power, represented diagrammatically by a member 15. At both ends of the conveyor pipe 12 are end plates 16 which may carry bearings for support of the screw conveyor member. At an intermediate point, longitudinally, is another plate member 17 through which the conveyor shaft extends. Conveyor 18 serves to convey the raw carbon black from a storage, not shown, through an opening 32 to the feed distribution conveyor 19. The conveyor tube 12 contains several openings 33 for discharge and spaced for distribution of raw carbon black into the pellet mill. Member 20 is a hopper-like proportioning or dividing member. Openings 27 permit outflow of carbon black pellets into this dividing member. A large mesh hardware cloth 21 serves to remove coarse "scale" or foreign objects which might inadvertently be present in the discharging pelleted black. A damper-like member or other type proportioning mechanism 23 serves to divide the stream of pellets into two parts, one portion flowing through a tube 25 as product, the other flowing through a tube 24 is discharged on a conveyor, such as belt conveyor 26. This belt elevates and transports the recycle pellets and finally discharges them into a hopper 28 from which they flow by gravity through a tube 29 into the charge end of the pellet mill. A lid 22 serves as a protective cover to the proportioning box 20, and is so constructed that it may be raised or removed from its normal position to give access to the interior of box member 20.

Openings 27, as shown in the drawing, see Figures 4 and 5, are shown as two rectangular openings. There may be, however, only one such opening, or even more than the two shown, depending upon the number required to permit removal of the proper volume of carbon black pellets. Since the number of these openings in a given installation will be more or less fixed, same should be provided with slide covers 31 or other means by which the openings may be varied in size, or even closed off entirely. A tube 30 is a means for continuous removal of separated scale and foreign matter. A plate 34 covers the discharge end of the mill and is attached rigidly to the conveyor tube 12 for support. The lower portion of this cover plate terminates at the top of the proportioning box 22 so that opening 27 may be open for discharge of carbon black at the lower portion of its cycle.

The following detailed construction of the discharge end of the mill is suggested as one means of accomplishing a result. End wall 35 contains openings 27 mentioned above. This end wall of course is fixed to the cylindrical shell of the mill, but is not fixed to the conveyor tube 12 since the mill rotates and said conveyor tube 12 does not rotate. Slide cover 31 contains an opening spaced in relation to opening 27, but smaller than this latter opening. The slide is intended to make the effective opening adjustable as regards distance from the periphery of the mill as well as size. The slides 31 may be adjusted by access through the top of proportioning box 20 by raising or removing the lid 22.

The mill may be supported on rubber tired wheels 36 as shown in Figures 1 and 3, for support and for rotational power. At least one assembly of these supporting wheels may be keyed to a drive shaft 38 which serves to drive or rotate the mill. A source of power 37 for driving this wheel system and the mill may be any power means desirable or available, such as electric power, an internal combustion engine, or power may come by a belt or chain from a remote source of power.

Figure 6 is intended to illustrate the spring loaded scraping means for removal of adherent carbon black from the walls of the mill. The spring loaded scraper means 39 is rigidly attached to and supported by the conveyor pipe 12 which in turn may be at least partially self supporting. However, to insure more certain rigidity of the conveyor pipe 12, especially for long pellet mills, it is well to install an auxiliary supporting means, such as I-beams 40. Scraper base member 43 is welded to the conveyor pipe and contains a compression spring 42 which pushes push member 41 carrying scraper 44 so that the latter substantially contacts the inner wall. This scraper assembly is installed to operate from such a position so that loosened scale will not fall upon conveyor tube 12, and so that the scraping member 44 will not interfere with the cascading bed of pellets. The scraper assembly is accordingly installed so that the loosened scale will fall freely to the bottom of the mill at a point which is substantially free from pellets and to accomplish this result the scraper is mounted approximately horizontally so that scraper member 44 contacts the wall of the cylindrical mill at a point which is travelling downward. As shown in Figure 6 the mill rotates clockwise and the scraper assembly extends to the right of the conveyor tube 12. The scraper could be mounted to extend to the "left" of the conveyor tube 12 but in this case the mill should rotate "anti-clockwise."

Since carbon black pelleting mills are relatively long, I prefer to construct the scraper as a small unit and to use as many units as necessary dependent upon the length to be kept clean.

In this respect I have made such scrapers in approximately six foot lengths, so that in a 24 foot mill, four such individual scrapers are required;

and in a 48 foot mill eight units are used. A quarter or half inch clearance should preferably be allowed between successive scraper members 44 so that closer contact between scraper members 44 and the side wall of the mill will be realized.

In the operation of my herein disclosed pellet mill, raw, undensed carbon black is fed by the screw conveyor 18 or other suitable conveying means into conveyor 19 through the feed opening 32. This raw carbon black may come directly from the production furnaces by way of bag filters or an electroprecipitator or from an intermediate or "run" storage, and is undensed black weighing about 3 pounds per cubic foot. Conveyor 19 picks up the feed and actually transfers it into the pellet mill by way of one or more openings 33 along the bottom side of the conveyor tube 12. As the mill revolves about its longitudinal axis this newly added black adheres to the surface of the pellets in this feed end of the mill. A full charge of pellets is present at all times in the feed end of the mill as a result of a rather large recycle ratio. In normal operation when about 350 pounds per hour of raw black is added as feed to the mill, about 1200 pounds of pellets per hour are recycled, the weight ratio thus being nearly 3.5 to 1. Under such feed and recycle conditions a mill 6 feet in diameter and 24 feet in length may well be driven at about 15 R. P. M. By maintaining the mill "level," that is, the feed and discharge ends at the same elevation, a bed depth of about 10 inches results. The position and size of the pellet outlet openings 27 also affect the bed depth, as well as do the number of revolutions per minute, rates of feed and recycle and many other conditions. I have found, however, that when operating under the above given conditions a stable pellet bed results and the pellets issuing as product are relatively hard, will stand shipment and yet are sufficiently friable and easily pulverized as to permit standard rubber milling.

The number and position of the feed black openings 33 in the bottom of the conveyor tube 12 may vary within rather wide limits and yet produce pellets of good quality. In case one feed opening is used, the amount of raw black fed therethrough may be limited since too much flocculent black at any one point may tend to make the pellets too large and of improper density and accordingly unstable. By this term "unstable" is meant that the pellet is not sufficiently hard to withstand compacting or subsequent handling. Such pellets frequently disintegrate or break up in the downstream end of the mill during polishing and compacting.

Better pellets seem to be the result of small additions of raw black to pellets or nuclei already formed. Thus a preferable method of raw black addition is several additions of relatively small quantities of black with at least a short period of compacting during which substantially no new black is added. Thus by proper spacing of the feed openings 33, this operation is achieved. I have found that such spacings as 2, 5, 8 and 11 feet from the inlet end of the mill with approximately equal additions of raw black through each of these spaced openings, yielded good quality pellets. The plate 17 in conveyor tube 12 in addition to furnishing a bearing for the conveyor screw shaft 14 serves as a stop to prevent passage of flocculent black toward the drive end of the shaft.

The pellet discharge openings 27 may be fully open or may be closed in part by the slide covers 31. Figures 4 and 5 show more in detail the operation of the slide covers 31 than do Figures 1 and 3. Openings 27 may be substantially any size desired, provided they are sufficiently large to permit discharge of a maximum quantity of pellets. Preferably, these openings should be larger than necessary so that slides 31 may at least in part control the effective opening of 27. In addition it is intended that in raising or lowering slides 31 that the effective opening may be raised or lowered with respect to the cylindrical wall of the pellet mill. By this adjustment the pellet bed depth may be controlled to increase or decrease the pressure on the pellets in process and to increase or decrease the residence time in the mill, as desired.

From these pellet discharge slots 27 the pelleted black falls upon a coarse hardware cloth for removal of foreign matter such as bolts, nuts, rivets, and the like. The cloth also removes large pieces or fragments of carbon black scale which have broken off or have been scraped off the interior wall of the mill. Since the actual pellets are usually about one eighth inch or less in diameter the use of this quarter inch mesh hardware cloth exerts no sizing whatever with respect to the pellets.

The pelleted material free from scale and foreign matter is divided or proportioned by divider 23. This divider may be similar in structure to a damper or butterfly valve, or any other kind of a proportioner or divider adapted to handle material of the nature of carbon black. This divider 23 is so adjusted as to divide out about 1200 pounds per hour of pellets when the feed rate to the mill is approximately 300 pounds of raw black per hour. The 1200 pounds of pellets per hour pass through tube 24 to the belt or other conveyor or elevator 26 for transfer to the inlet end of the mill. These pellets are discharged into the hopper 28 and pass through the tube 29 into the mill.

The remaining portion of the pellets cut out by the divider 23 pass by way of conduit 25 to storage or other disposal, as desired.

The entire pellet mill may be supported on a system of rubber tired wheels both for purposes of support and purposes of rotation. The number and size of the tired wheels, both driving and driven may be selected from an engineering consideration to give the best operation.

The actual agglomerating mechanism occurring during the pelleting operation is not definitely known, but it is known that by exposure of flocculent carbon black to certain conditions agglomeration does occur. All pelleting processes involve use of agitation of one form or another, and of varying degree. Some use violent and vigorous agitation, while other use a slow, rolling motion with mechanical means for assisting in compacting or imparting slight pressure to the pellets in process. For my particular problem all these so-called "known" processes have failed. I have found that the fewer the number of mechanical elements taking an active part within the pellet mill the better are the pellets produced. I use no bands nor rods nor other agitation producing means within the bend of "agglomerating" carbon black. I have found that when a pellet is exposed to relatively severe contacting conditions it may be broken or crushed at a faster rate than it can grow, and when the severe conditions exist, that is, too mild conditions, the pellets may tend to "over grow." In this latter case the black may tend to "ball" and become large agglomerates which easily break up. One important point about carbon black is that when the black is once in pellet form, and the pellets or agglomerates broken up or crushed, repelleting is a very difficult operation. Thus, I have found that too slight agitation is about as disadvantageous as too violent agitation. It is this point, apparently, wherein "known processes" have failed to pellet some furnace blacks, and I have found the proper more or less critical conditions for successful pelleting after much experimentation.

I have stated hereinbefore that I made commercially acceptable pellets in a mill 6 feet in diameter by 24 feet in length. In this mill were no rolling nor compacting nor extraneous pressure imparting members. All pressure exerted on the forming pellets was imparted by carbon black pellets previously formed. I have found that apparently the proper pressure for forming pellets can be controlled by control of the pellet bed depth and the R. P. M. of the pellet mill for a mill of a given diameter. Too much flocculent black should not be added to a pellet at one time since apparently such a pellet is too soft and is easily broken. For this reason I prefer to utilize multipoint flocculent black addition with an interval between additions for compacting. In this manner pellets of good density can be produced. In the above mentioned pellet mill 24 feet in length, I have made good pellets by adding black at points 2, 5, 8, and 11 feet from the inlet end of the mill. The first two feet are apparently utilized in recompacting and reconditioning recycle pellets, some of which may have been broken or altered in some manner during removal from the discharge end of the mill, or separation of the carbon black scale, or proportioning and/or recycling operations. At the 2 foot point, some flocculent black is added and this adheres to the pellets, is compacted during three feet of longitudinal travel to form conventional looking pellets. More black is then added, recompacting repeated, etc. until the required number of additions of black have been made. Following the final addition of black at the 11 foot point, then compacting, hardening and polishing is carried out during the remaining 13 feet of the mill.

As the mill rotates around its longitudinal axis as a center, the relatively spherical pellets roll back over one another or "cascade" especially in the "compacting" regions of the mill. This cascading action is well understood in the ball or tube mill grinding art, and in certain mixing arts, for example, dry Portland cement, sand and crushed stone are mixed by "cascading" in motor driven, rotary concrete mixers. An excellent example of cascading is obtained in the "rotary kiln" method of making sponge iron wherein the coal (reducing agent) and the iron ore had been crushed to pass approximately an eight mesh screen.

During rotation of my pellet mill, pellets are carried upward substantially following the periphery of the mill, until the "angle of repose" of pellets is reached or exceeded, then pellets roll back over the main mass of pellets, and it is apparently this rolling, cascading action which gently but firmly causes compacting of a surface layer of flocculent black on a pellet center. If a pellet mill rotates too rapidly, this cascading action may not occur since a charge stock may then tend to remain in contact with the mill walls due to centrifugal force. At intermediate speeds cascading is not normal and a "throwing" action may predominate, and as pellets are thrown breakage is excessive, and poor pellets to no pellets at all are formed. If a mill rotates too slowly, fair quality pellets may or may not be formed depending upon other conditions, but it is obvious that capacity will be sacrificed. Thus for commercial operation it is obvious that a mill should be operated as fast as possible consistent with the making of commercially acceptable pellets.

I have found that the multipoint addition of flocculent black with a compacting period between black additions materially increases capacity of a given pellet mill. In addition to this advantage, pellets so made have a density of 20 pounds per cubic foot or even more, and stand shipment remarkably well. In a 24 foot mill the black need not be added at "four" points as mentioned above, but may be added at fewer points or even more points providing sufficient compacting between additions can be effected. Similarly, the location of such addition points may be varied within reason and yet produce good pellets.

My carbon black pelleted product contains pellets of many sizes ranging from those of very small diameter to large ones, and I have found no reason for separation of the product according to size of pellets. All processes of which I know which employ a recycle, screen or size the pelleted product into two or more sizes, for example a product size, an oversize and an undersize. These known processes then remove the product size pellets as product and recycle the undersize pellets as nuclei upon which is added flocculent black for making pellets of product size. Oversize pellets are usually broken or crushed in some manner and the crushed fragments also recycled as nuclei for production of proper sized pellets. I have found that when treating my furnace black under proper conditions that screening or sizing of the mill output is unnecessary, and all I do for recycle is to "divide or proportion" with no sizing whatever, the mill discharge, recycle one portion and remove as product the other portion. A screen analysis of these two portions showed that they contained substantially the same percentage of like sizes, within experimental error. By elimination of the conventional sizing or screening step previous to recycling, a definite advancement in the art of pelleting has been accomplished.

In the operation of my process the maximum size of pellets produced is about ⅛ inch diameter. Lengthening the "compacting" section following the final point of flocculent black addition tends to decrease the maximum size of pellets, possibly through breakage of the larger pellets or due to more compacting, which latter would result in a more dense product.

The "multi-point" addition of flocculent black to the pellet mill is intended to mean "serially" or "longitudinally." Several addition points could be located equidistant from the inlet end of the mill but spaced around the lower half of the periphery of the mill, but this type of multi-point addition is not intended. For best operation I prefer to add the raw black at several spaced points substantially along the longitudinal axis of the mill, as may be seen on reference to the inlet openings 33 in the bottom of the conveyor tube 12.

For removal of the coarse carbon black scale from the mill discharge I use a ¼ inch mesh hardware cloth as illustrated in the drawing and referred to by reference numeral 21. Any size opening desired may be used, for example a inch opening, or one as large as 5/8 inch or even larger may be used if it is found not undesirable to recycle such large pieces of scale.

I have found the herein disclosed pelleting method and apparatus especially adaptable to pellet carbon black made according to the furnace method described in the herein before mentioned Krejci patent. It is also adaptable for use with carbon black made by other methods by the proper adjustment of the operating variables.

I have also found that the use of a micropulverizer installed to treat the flocculent feed to my pellet mill for pulverizing foreign matter has no observed adverse effects on the operation of my process. Such treatment of the flocculent carbon black improves rubber compound "extrusion" by pulverizing relatively large sized pieces of inert or non-carbonaceous material, such as oxide from conveying pipes or from an electro precipitator, or even pieces of refractory from the production furnaces.

For transferring the recycle portion of the pelleted black I prefer to use one or more "belt conveyors," the number used, of course, depending upon conditions. The reason for use of this type of conveyor is that breakage of pellets is kept at a minimum, and this point is important since a pellet once broken is somewhat refractory to repelleting. However, any other type of conveyor could be used provided it does not cause breakage of the pellets transferred.

Hereinbefore I have described a 6 foot diameter and 24 foot long pellet mill, I do not wish to be limited in any manner to a particular size of mill, especially since I have successfully used a 48 foot long mill of diameter 6 feet. Raw black addition points were 6 feet, 18 feet and 33 feet from the inlet end of the mill. Excellent quality pellets were made in this larger mill, with or without the use of a micropulverizer on the flocculent feed.

The following tabulation shows operating conditions when using the 24 foot and 48 foot pellet mills:

While I have attempted to some extent to explain factors involved in pelleting, and growth and building up of pellets with flocculent black followed by a compacting step, etc. it should be understood that the exact nature and cause of the results attained are not fully understood. Accordingly I do not wish to be limited by such theories or explanations, but only by the following claims.

The term "density of approximately 20 pounds per cubic foot" as herein applied to pelleted carbon black is intended to include densities ranging from as low as 16 or 17 pounds to as high as 25 or 26 pounds per cubic foot or even higher. I have made pellets by my process weighing more than 26 pounds per cubic foot.

I claim:

1. In the art of pelleting dry, flocculent carbon black, the steps which comprise continuously elevating one side of an elongated bed consisting of carbon black pellets and flocculent carbon black to effect a transverse downward rolling and tumbling movement of the elevated particles over the bed, recycling pellets from one end to the other end of said bed, and adding flocculent carbon black to said bed at a zone intermediate the ends thereof, the ratio of recycle material to flocculent carbon black feed being at least 2/3 to 1.

2. In the art of pelleting dry, flocculent carbon black, the steps which comprise continuously elevating one side of an elongated bed consisting of carbon black pellets and flocculent carbon black to effect a transverse downward rolling and tumbling movement of the elevated particles over the bed, withdrawing pellets from one end of said bed, dividing the withdrawn pellets into a recycle portion and a product portion each having the same size distribution, adding said recycle portion at the other end of said bed, and adding flocculent carbon black at a region of said bed intermediate the ends thereof, the proportion by weight of recycle material to flocculent carbon black feed being between 2/3 to 1 and 4 to 1.

|  | 24 ft. mill—6 ft. diam. | | 48 ft. mill—6 ft. diam. | |
| --- | --- | --- | --- | --- |
|  | Optimum | Satisfactory Operation | Optimum | Satisfactory Operation |
| Bed depth_____inches__ | 10 | 8 to 16 | 9 | 8 to 16 |
| R. P. M. of mill_____ | 14.7 | 7.5 to 15.4 | 8.4 | 7.5–15.4 |
| Rate of raw black feed, lbs. per hr_____ | 300 | Up to 350 | 800 | Up to 900 |
| Recycle rate, lbs. per hr_____ | 1,200 | 400 to 1,200 | 600 | 600–1,200 |
| Addition points of raw black, feet from inlet end of mill__ | 2, 5, 8, 11 | | 6, 18, 33 | |

It will be noted that the minimum recycle rate is 2/3 part by weight of recycle material to one part of feed, the rate varying between 2/3 to 1 and 4 to 1.

The pellet mills for use as herein described may be made of such standard materials as are available. I have used steel shells for my mills, but other materials could probably be used without influencing the pelleting operation. Auxiliary equipment such as the 1/4 inch hardware cloth, belt conveyors, etc., may be made of any materials available and satisfactory for the purpose, and of substantially any type desired provided, of course, adverse influences do not present themselves. The rotating mechanism of the mills may be constructed as desired, and whether electrical driven or engine driven, is of course, immaterial.

Many other factors in such a process and apparatus for carrying out such a process may be varied within wide limits with no harmful effects.

3. In the art of pelleting dry, flocculent carbon black, the steps which comprise continuously elevating one side of an elongated bed consisting of carbon black pellets and flocculent carbon black to effect a transverse downward rolling and tumbling movement of the elevated particles over the bed, recycling pellets from one end to the other end of the bed, and adding flocculent carbon black at longitudinally spaced zones along said bed, whereby the pellets are compacted at the regions of said bed between said addition zones, the ratio by weight of recycle material to flocculent feed being at least 2/3 to 1.

4. In the art of pelleting dry, flocculent carbon black, the steps which comprise continuously elevating one side of an elongated bed consisting of carbon black pellets and flocculent carbon black to effect a transverse downward rolling and tumbling movement of the elevated particles over the bed, withdrawing pellets from one end of said bed, dividing the withdrawn pellets into a recycle portion and a product portion each having the same size distribution, adding said recycle portion at the other end of said bed, and adding flocculent carbon black at longitudinally spaced zones along said bed, whereby the pellets are compacted at the regions of said bed between said addition zones, the ratio by weight of recycle material to flocculent carbon black feed being within the range of 2/3 to 1 and 4 to 1.

MERTON L. STUDEBAKER.

REFERENCES CITED

The following references are of record in the file of this patent:

UNITED STATES PATENTS

| Number | Name | Date |
|---|---|---|
| 2,052,329 | Wendeborn | Aug. 25, 1936 |
| 2,164,164 | Price | June 27, 1939 |
| 2,167,432 | Cox | July 25, 1939 |
| 2,213,056 | Skoog | Aug. 27, 1940 |
| 2,311,154 | Carney | Feb. 16, 1943 |
| 2,327,016 | Carney | Aug. 17, 1943 |
| 2,332,057 | Carney | Oct. 19, 1943 |